Figure 1:
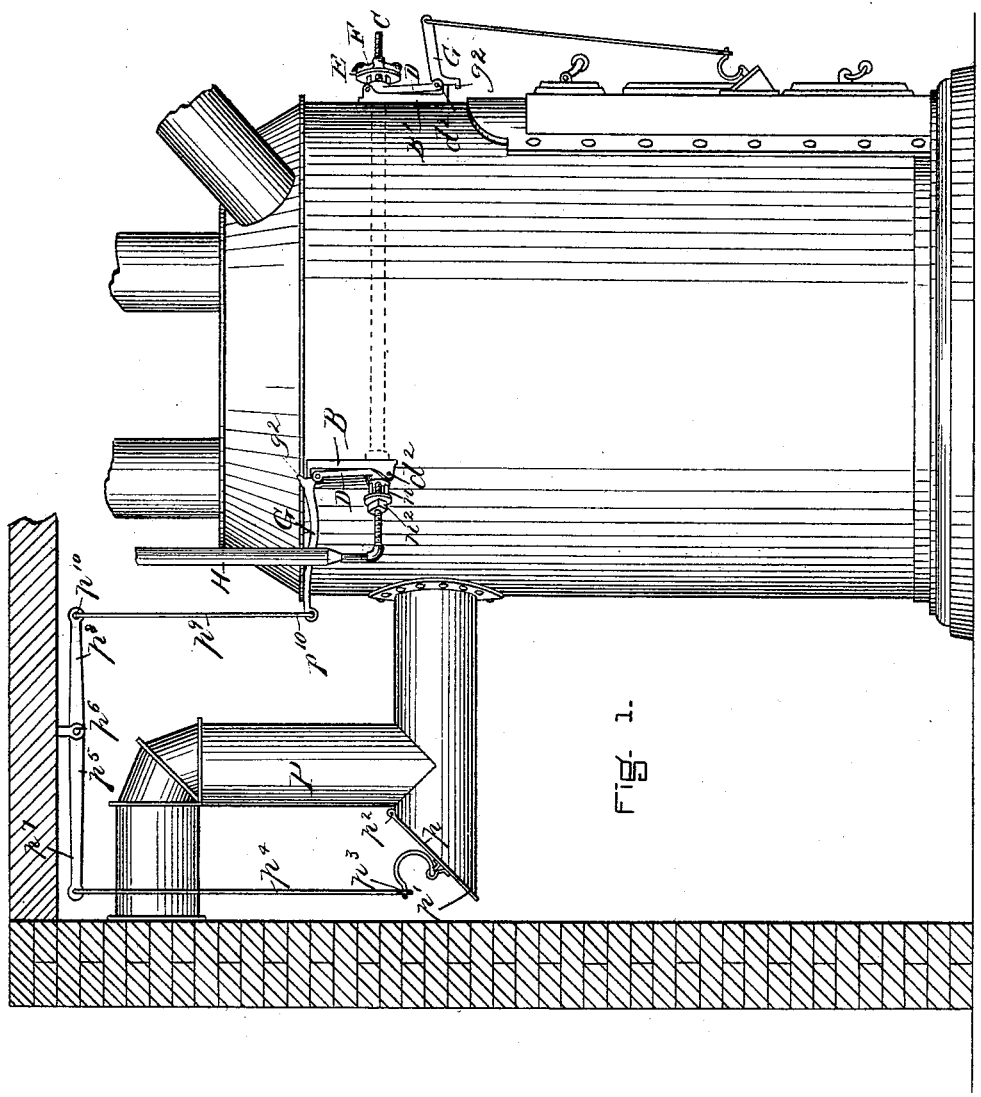

(No Model.) 5 Sheets—Sheet 1.

E. G. & A. B. STEVENS.
AUTOMATIC REGULATOR FOR FURNACES OR STOVES.

No. 388,087. Patented Aug. 21, 1888.

(No Model.) 5 Sheets—Sheet 2.
E. G. & A. B. STEVENS.
AUTOMATIC REGULATOR FOR FURNACES OR STOVES.
No. 388,087. Patented Aug. 21, 1888.
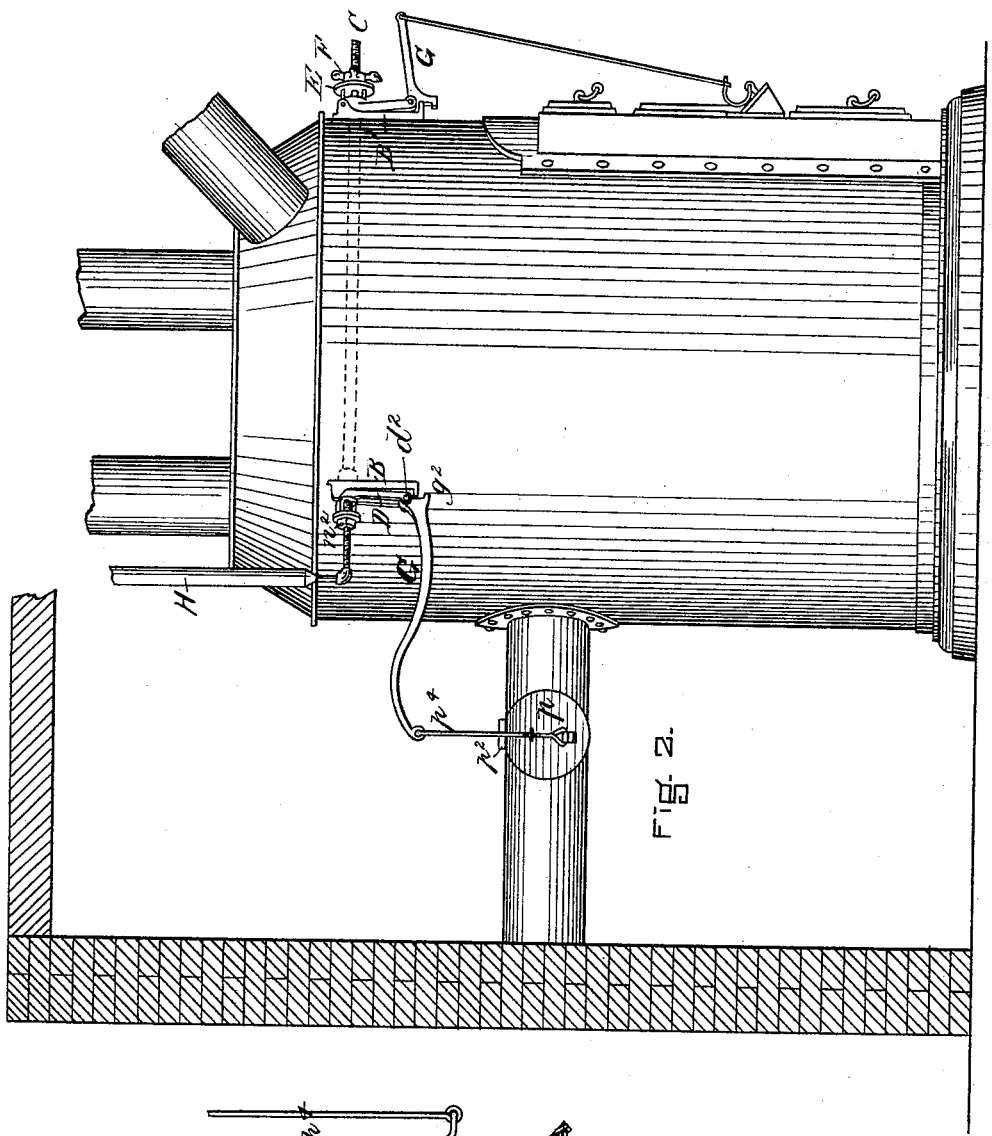
Fig. 2.
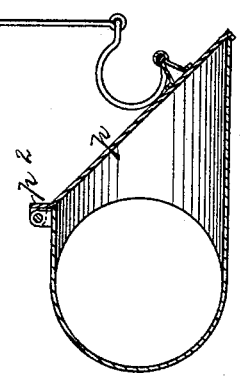
WITNESSES. INVENTORS.

(No Model.)  5 Sheets—Sheet 3.
E. G. & A. B. STEVENS.
AUTOMATIC REGULATOR FOR FURNACES OR STOVES.
No. 388,087.  Patented Aug. 21, 1888.
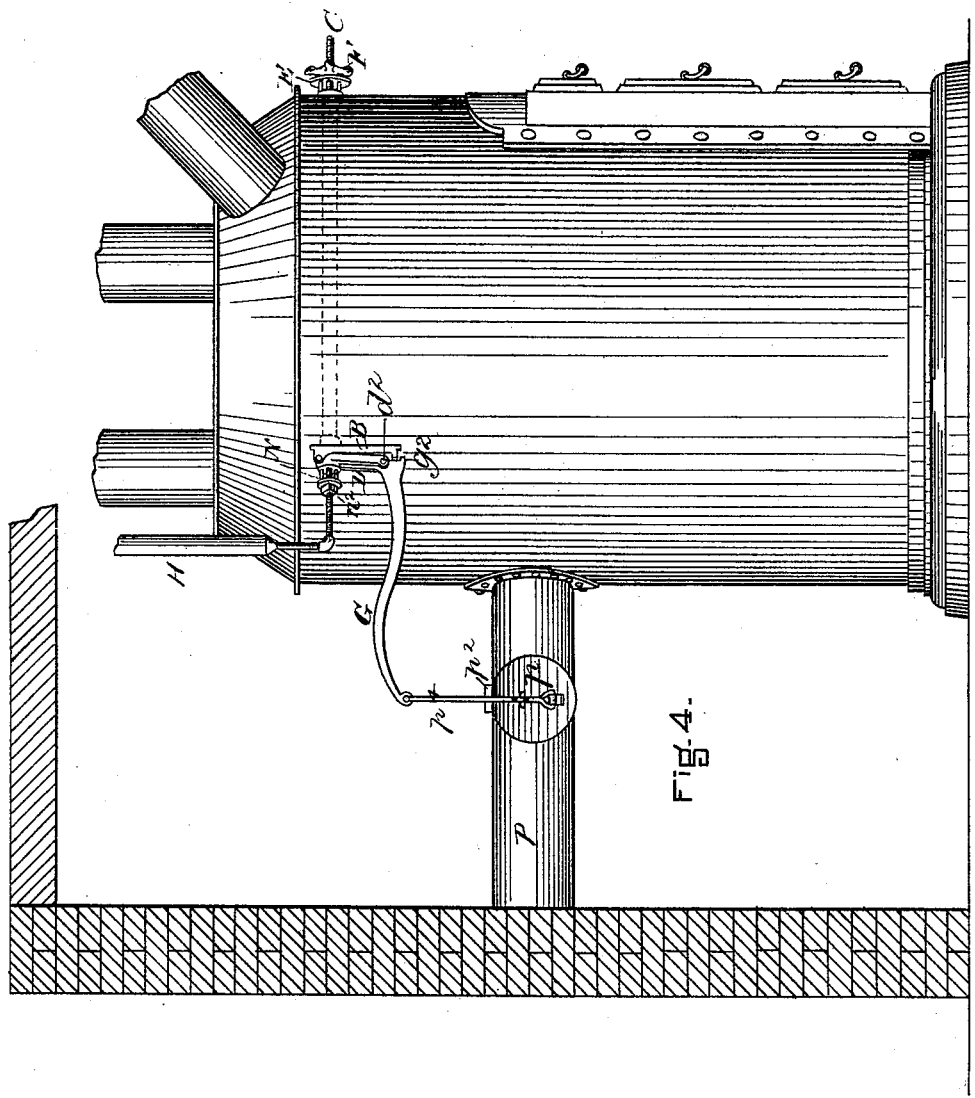
WITNESSES.
J. Mc. Dolan,
Fred. B. Dolan,
INVENTORS.
Edward G. Stevens,
Abbott B. Stevens,
by their attys.
Clarke & Raymond.

(No Model.) 5 Sheets—Sheet 4.

E. G. & A. B. STEVENS.
AUTOMATIC REGULATOR FOR FURNACES OR STOVES.

No. 388,087. Patented Aug. 21, 1888.

WITNESSES.
J. M. Dolan
Fred. B. Dolan

INVENTORS.
Edward G. Stevens
Abbott B. Stevens
by their atty
Clarke & Raymond (No Model.) 5 Sheets—Sheet 5.

E. G. & A. B. STEVENS.
AUTOMATIC REGULATOR FOR FURNACES OR STOVES.

No. 388,087. Patented Aug. 21, 1888.

WITNESSES.
J. M. Dolan
Fred. B. Dolan

INVENTORS.
Edward G. Stevens
Abbott B. Stevens
by their atty
Clarke & Raymond

United States Patent Office.

EDWARD G. STEVENS AND ABBOTT B. STEVENS, OF CLINTON, MASSACHUSETTS, ASSIGNORS TO THE RIDGWAY FURNACE AND STOVE COMPANY, OF NASHUA, NEW HAMPSHIRE.

AUTOMATIC REGULATOR FOR FURNACES AND STOVES.

SPECIFICATION forming part of Letters Patent No. 388,087, dated August 21, 1888.

Application filed January 25, 1886. Serial No. 189,704. (No model.)

*To all whom it may concern:*

Be it known that we, EDWARD G. STEVENS and ABBOTT B. STEVENS, both of Clinton, in the county of Worcester and State of Massachusetts, citizens of the United States, have invented a new and useful Improvement in Automatic Regulators for Furnaces and Stoves, of which the following is a full, clear, and exact description, reference being had to the accompanying drawings, forming a part of this specification, in explaining its nature.

It is important in furnace regulation employing a tube expansible by heat and a comparatively non-expansible bar, rod, or device for directing, utilizing, or conveying the motion of the expansible tube that the non-expansible rod or device be protected from heat to as great an extent as possible, as otherwise the efficiency of the regulator is impaired and its action becomes irregular and unreliable, for the rod or device, while comparatively non-expansible when subjected to heat, must expand to a limited extent and may become so hot as to bend or buckle or draw, and it then, of course, becomes an unreliable factor of the regulator. It is therefore very essential that this part of the regulator be kept at an even and comparatively low temperature, and our invention relates to means for accomplishing this result.

This invention is an improvement upon the automatic regulator described in the application for patent of Charles L. Ridgway, filed July 27, 1885, Serial No. 172,749; and it relates, first, to the use within the expansible tube of a non-expansible inner tube by which the motion necessary for operating the damper or dampers is communicated to the intermediate levers instead of to a solid rod; second, to an air-space arranged between the inner and outer tubes, which is connected with the outer air, and provides a circulation of cool air about the inner tube; third, to the manner of connecting and arranging the ends of the expansible and non-expansible tubes, so that the inner tube cannot be heated by the conduction of heat from the outer tube; fourth, to cooling and keeping cool the inner or non-expansible tube by causing a current of cold or cool air to pass through it; and, fifth, to various details of organization and construction.

Figure 5:
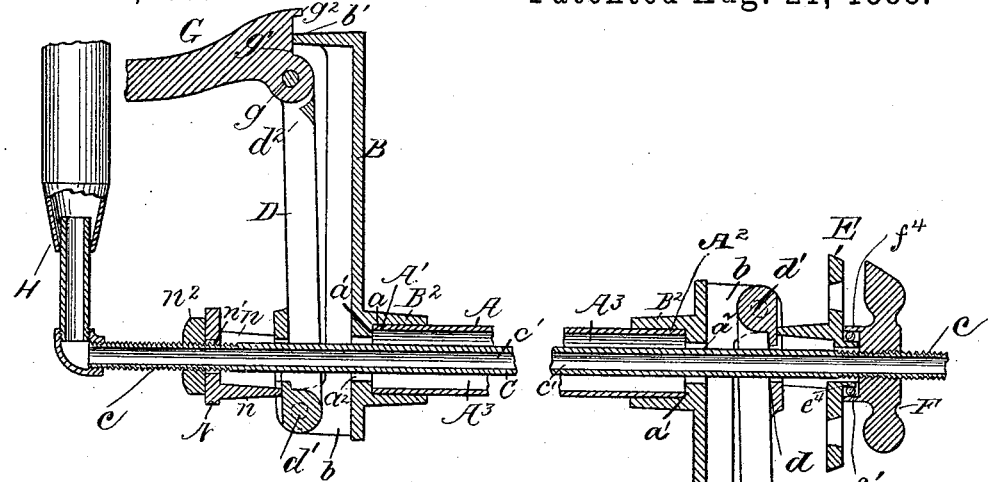
Figure 6:
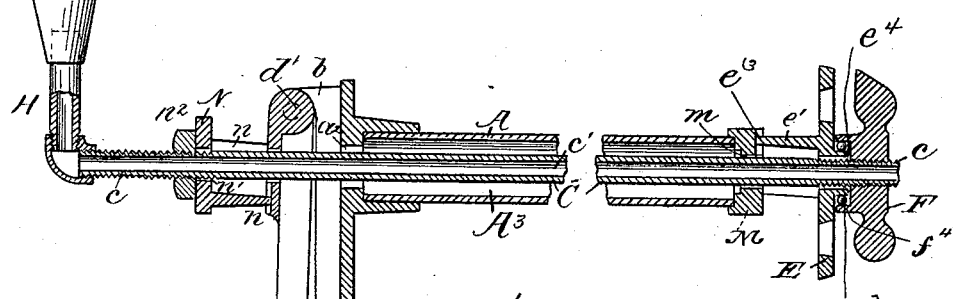
Figures 7, 8, 9:
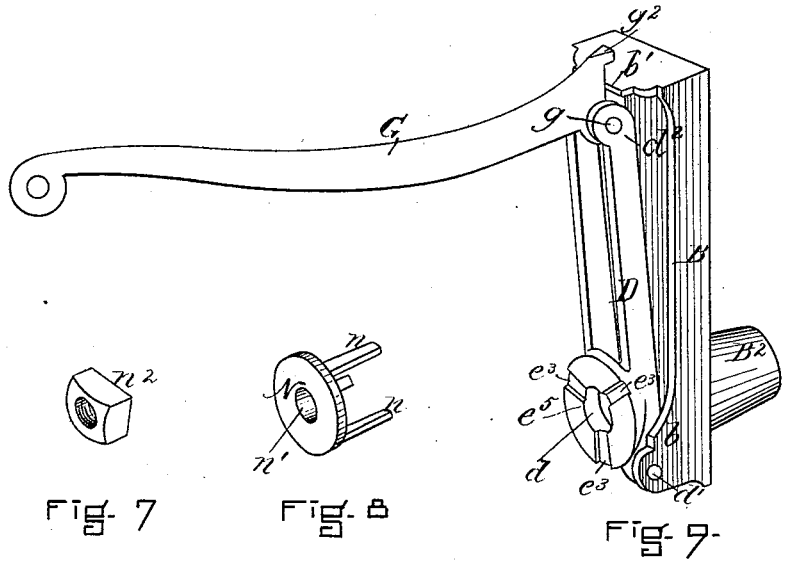

Figure 1 is a view in side elevation of a furnace containing an automatic regulator provided with the features of our invention. Fig. 2 represents in side elevation a furnace having an automatic regulator, showing a somewhat different connection between it and the valve of the cold-air inlet. Fig. 3 is a view in section, enlarged, of the cold-air inlet and valve for closing the same, to which reference is hereinafter made. Fig. 4 is a view of a furnace, showing the regulator adapted to operate the valve of the cold-air inlet only. Figs. 5 and 6 are enlarged views in section to illustrate the construction of the regulator. Figs. 7, 8, and 9 relate to the form of device used for securing one end of the regulator when it is used for operating one valve only. Figs. 10, 11, 12, and 13 are views in detail of parts of the regulator.

A is the expansible tube. It is made of brass or other composition of a similar nature, which expands uniformly and readily when heated. It is arranged to extend across the hot-air chamber of the furnace, and its ends $A'$ $A^2$, when it is used to operate two dampers or valves, as represented in Figs. 1 and 2, enter the holes $a$ in the sleeves $B^2$ of the plates B B' and bear against the shoulders $a'$. These plates B B' are on the outside of the furnace-casing. The sleeves $B^2$ extend into holes formed in the casing.

Within the tube A is a tube, C, made of iron or some metal not expansible to any extent at a comparatively low temperature, and this tube extends beyond the ends of the brass tube A through the continuations $a^2$ of the holes $a$, and has a screw-thread, $c$, on each end. Each end also passes through the hole $d$ in the lever D, and it is connected with the lever at the front of the furnace by means of a collar or disk, E, the face of which forms a dial having the enlarged hole $e$ and the legs or studs $e'$, which extend inward from its inner surface about the opening $e$, the ends $e^2$ thereof entering the holes or recesses $e^3$ in the face or that portion of the lever D about the tube C. The dial-disk is held in place by means of the indicator-nut F, which screws upon the end $c$ of the tube. This nut preferably has a sleeve, $f^4$, forming a cavity or space, $f'$, within which there may be placed balls $f^2$ to bear against the outer surface of the disk E and provide a ball-bearing, if desired, so that the nut may be easily turned when it is desired to adjust the dampers, as hereinafter explained. When this construction is employed, the dial-disk is provided with the short outward-projecting sleeve $e^4$. The back end of the tube C is attached to the rear lever, D, by means of a disk, N, resembling the dial-disk in that it has studs to enter the holes or recesses of the lever D, and a nut, $n^2$, which screws against the disk. (See Fig. 5.) Each lever D is pivoted at $d'$ to the ears $b$, extending outward from the plates B B', respectively, and the levers each carry at their outer ends, $d^2$, another lever, G, which is pivoted at $g$ thereto and which is shaped to provide a bearing-surface, $g'$, arranged to bear against the projection $b'$ of its respective plate B or B', and the extension $g^2$, which furnishes or provides a stop.

The tube C must be of sufficient size and strength to hold the levers against the thrust of the tube A without elongating, and it should also be of a size to provide a hole, $c'$, of a capacity to permit the passage of cold air through it. The expansible tube A must be of a size sufficient to inclose the tube C and provide about it an air chamber or space, $A^3$.

It will be observed that the inexpansible tube C is not connected with the ends of the expansible tube A, or directly with any part immediately connected therewith, so that it cannot be heated by the conduction of heat from the expansible tube A or from the furnace-casing. It will also be observed that the tube A is open at each end to the outer air, so that it is free to pass through the space $A^3$. The passage $c'$ in the tube C we have represented as connected with the cold air without the house or building in which the furnace is located by means of a tube or pipe, H, so that a constant circulation of cold air through the inner inexpansible tube, C, is provided.

Figures 10, 11, 12:
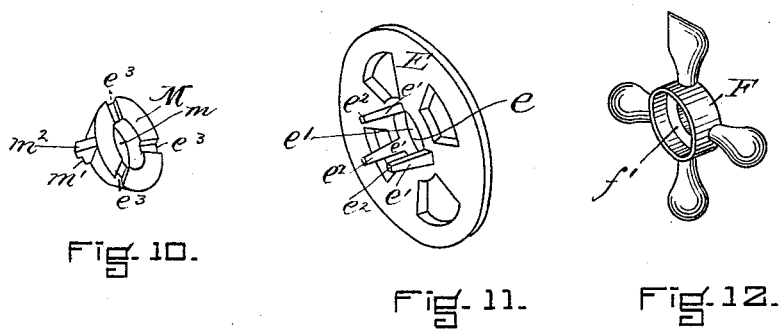
Figure 13:
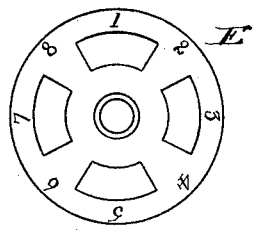

In case the regulator is used for controlling but one damper, we use the dial at the front end of the tubes, and in lieu of the front plate, B', and the connections above described we employ the construction represented in Figs. 6 and 10, which consists, in substance, of a collar, M, having an enlarged hole, $m$, through which the end $c$ of the inexpansible tube passes, and narrow projections $m'$, provided with shoulders $m^2$, to receive the end of the expansible tube, the tube fitting the shoulder within the extensions. This piece is in substance the equivalent of that portion of the plate B against which the end of the tube comes in contact, and it provides the passages connecting the interior of the expansible tube with the outer air. This collar also has the recesses $e^3$, which receive the legs or arms $e'$, extending inward from the collar or disk E.

We have represented the damper controlling the cold-air inlet to the direct escape-port as somewhat differently constructed and connected with its operating-lever from that described in the Ridgway application hereinbefore referred to, and in the drawings, P represents the direct escape-passage from the furnace to the chimney-flue, $p$ the cold-air inlet, $p'$ the damper-plate, which is pivoted at its upper end outside the inlet to the pipe or casing at the point $p^2$. The inlet to the pipe is inclined, so that the valve or damper $p'$, when closed, has an inclined position. (See Fig. 1.) It is connected with its operating-lever preferably by means of the spring-arm $p^3$, attached to the outer surface of the plate $p'$ about two-thirds of the distance from the pivotal point to its lower end, the rod or wire $p^4$ connecting it with the lever $p^5$, the said lever $p^5$, pivoted at $p^6$, having the long arm $p^7$ and the short arm $p^8$, the rod or wire $p^9$ connecting its end $p^{10}$ with the end of its operating-lever G.

By forming the inlet and the damper as described we are enabled to do away with the counterbalancing-weight described as necessary in said Ridgway application to prevent dust and soot from clogging the hinge or joint or entrance to the cold-air inlet and to always provide for the seating or closing of the inlet; and by the use of the spring connecting-arm $p^3$ a take up and yielding connection between the damper and the rod or wire $p^4$ is established, which assists very materially in the perfect working of the device. We do not, however, claim herein this spring-connection, as we have made it the subject of a separate application.

It is obvious that so far as the connection between the tube C and the lever D is concerned the same form of connection will operate as well with a rod as with a tube, and we would therefore say that we do not confine ourselves to the use of this portion of the invention and its connection with a tube only.

Of course it makes no difference so far as the operation of the regulator is concerned where the valve or damper for controlling the lower draft is placed.

Having thus fully described our invention, we claim and desire to secure by Letters Patent of the United States—

1. The combination, in a furnace-regulator, of a metal tube expansible under heat, an inclosed tube of less expansible metal, a plate, B, against which the outer tube bears, a lever, D, having the hole $e$ and recess $e^3$, the dial E, having the studs or legs $e'$, and the indicator-nut F, which screws upon the end of the inner tube and locks it against the lever D, substantially as described.

2. The combination, in an automatic regulator for furnaces and stoves, of the metal tube A, expansible under heat and connected at each end with a plate supporting a lever, D, substantially as set forth, the said plate, a tube inclosed within said expansible tube, the ends of which extend without the furnace, and nuts mounted upon or having standards or legs connecting said ends with the said levers D, all substantially as described.

3. The combination, in a furnace-regulator, of the expansible tube A, the plate B, having the hole $a^2$, the recess $a$, and shoulder $a'$, the non-expansible inner tube extending through the hole $a^2$, the lever D, pivoted to said plate, as described, and having a hole, $d$, the lever G, operated by the lever D, as specified, the dial E, mounted upon the standards or posts $e'$, the ends of which enter the holes or recesses $e^3$ of the lever D, and the indicator-nut F, which screws upon the end of the inner tube, substantially as described.

4. The combination, in a furnace-regulator, of the lever D, having the recess $e^3$, the tubes A C, connected with each other as specified, the dial E, having the legs $e'$, and the indicator-nut F, all substantially as described.

5. The combination, with the tubes A and C, of the dial-disk E, having the sleeve $e^4$, the indicator-nut F, having the sleeve $f^4$, and the balls interposed between the said disk and nut, substantially as set forth.

6. The combination, in an automatic regulator for furnaces and stoves, of the expansible tube A, the tube C, inclosed within the expansible tube, and the pipe H, for connecting the inclosed tube C with the outer air, all substantially as described.

EDWARD G. STEVENS.
ABBOTT B. STEVENS.

Witnesses:
JOHN W. CORCORAN,
J. E. HOWE.